July 6, 1948. J. J. VASTANO 2,444,684
EXPANSIBLE LINKAGE FOR BRACELETS
AND WATCH BRACELETS
Filed March 8, 1946

Inventor
JOSEPH J. VASTANO

By Parry · Miller
Attorneys

Patented July 6, 1948

2,444,684

UNITED STATES PATENT OFFICE 2,444,684

EXPANSIBLE LINKAGE FOR BRACELETS AND WATCH BRACELETS

Joseph J. Vastano, East Providence, R. I., assignor to F. & V. Manufacturing Co. Inc., East Providence, R. I., a corporation of Rhode Island Application March 8, 1946, Serial No. 653,057

2 Claims. (Cl. 59—79)

This invention relates to expansible linkage for bracelets and watch bracelets and the same is directed to an improved linkage of the type comprising a plurality of links arranged in pivotally connected pairs which is more durable and less likely to break than prior constructions, and which can be made economically.

Expansible linkage of the type indicated has been used for many years for bracelets, but as conventionally constructed are subject to frequent breakage, particularly if the linkage is twisted during handling, as likely to occur when applying a bracelet to or removing it from the wrist. Under the torsional strain developed by twisting the links have been found to bend and/or break, particularly at the points of connection with their connecting pivot elements. Such connecting elements, usually rivets or similar headed elements, tend to pull through the openings in the links due to the enlargement of the openings resulting from bending or breakage so that the links become disconnected. Due to the fact that the links are relatively small and should be comparatively light for bracelet purposes it is not practical to make the links of metal sufficiently heavy to resist the strains under the conditions indicated, nor is it practical to make the link sufficiently larger than customary to incorporate various forms of reinforcement.

One of the principal objects of the present invention is to provide an improved long life linkage which will successfully withstand torsional and other strains such as normally experienced in use.

Another object of the invention is to provide a linkage which will not only withstand strains imposed by twisting but which may be twisted to a considerable degree before any torsional strain is imposed on the links and their pivot connections.

A further object of the invention is to provide a linkage of sufficient durability for bracelet purposes which can be constructed of lighter sheet metal than ordinarily used and which at the same time will be less likely to breakage than linkage constructed of somewhat heavier metal.

As is well known, expansible bracelet linkage of the type indicated comprises a series of individual links made up of a main or inner section and an outer or cover section having tongues or flanges connecting it to the main section. Such links are arranged in pairs with the main sections of each pair pivotally connected at their centers. The opposite ends of the links of each pair are pivotally connected with the links of adjoining pairs. Springs are provided to normally retain the links of all pairs in retracted crossed relation by permitting the links to pivot and extend the linkage when subjected to lengthwise pull.

Inasmuch as it is desirable that the thickness of the linkage be maintained at a minimum the individual links are made comparatively thin overall. To this end it has been conventional practice to make the main or inner sections of the links of flat sheet metal and to form the outer shells as hollow stampings. With such arrangement it has been found that the pivot elements which connect only the main link sections tend to pull out and the main link sections tend to bend despite the presence of flanges or tongues on the shells which partially embrace the main sections.

According to the present invention the outer link sections may be made as conventionally but the main or inner link sections are formed in a manner to resist transverse bending at the center pivot area where bending and breakage is most likely to occur, also in other areas, all as will hereafter appear.

Further, instead of connecting various links together by rivets forming such tight connections between the links that they cannot shift substantially out of parallel planes without subjecting the links to strain, the links and their pivots are arranged to provide sufficient lost motion that any link may assume a considerable tilted relation with respect to the complementary link of the same pair and to the links of the other pairs connecting with its ends.

The invention will be understood by reference to the following drawing and the accompanying description.

Figure 1:
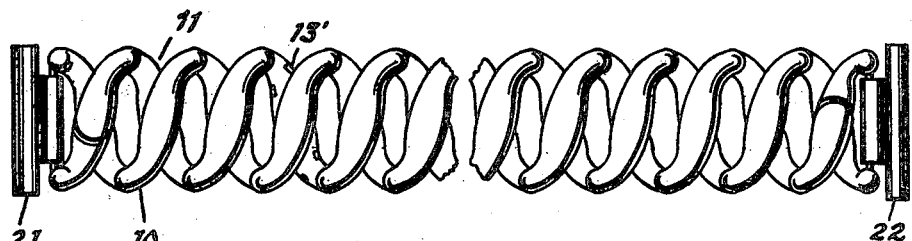
Fig. 1 is a plan view of a watch bracelet embodying the present invention.

In Fig. 1 the bracelet is shown as comprising centrally pivoted pairs of links 10 and 11 with the links of each pair pivotally connected at their opposite ends to the links of adjoining pairs.

Figure 2:
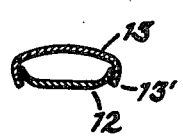
Fig. 2 is a cross-section of the individual link shown in Fig. 3.
Figure 3:
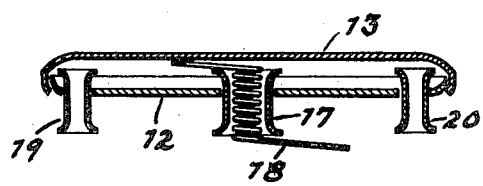
Fig. 3 is a longitudinal section of one of the individual links employed in the bracelet of Fig. 1; and, Fig. 4 is a perspective view, somewhat enlarged, of one element of the link shown in Fig. 3.
Figure 4:
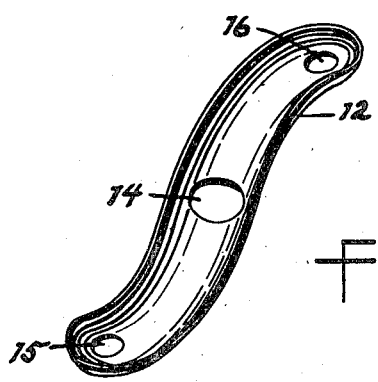

As shown in Figs. 2 and 3 the individual links comprise a main or inner section 12 and an outer or cover shell section 13. A series of tongues or flanges 13' are formed on the outer section 13 to partially embrace section 12 and secure the two parts together.

Formed at the center of the main section 12 is an aperture 14, and similar somewhat smaller apertures 15 and 16 are formed adjacent the opposite ends. A rivet 17 extends through openings 14 of sections 12 of each link pair. Rivets 19 and 20 are received in the respective end openings 15 and 16 of sections 12 of the links of adjoining pairs. Extending through the central rivet 17 is a coiled spring 18 having projected ends bearing against the side wall of the cover sections 13 of the links of the same pair and said springs are so arranged as to yieldingly hold such links in retracted position.

For purposes of clarity only one link of a pair is shown in Fig. 3. However, it will be understood therefrom that rivets 17, 19 and 20 are relatively long and of sufficient smaller diameter than the rivet receiving openings 14, 15 and 16 that a relatively flexible pivoted connection is provided between all connecting links. The rivets may tilt relative to each link and the links are capable of greater and substantial tilting relative to each other. Through this arrangement accidental twisting of the bracelet can be of considerable degree before the lost motion is taken up and a strain imposed on the main link sections 12 by the heads of the rivets.

Instead of making link sections 12 flat, as conventionally, they are stamped to dished form so as to have a more or less arc-shaped cross-section such as shown in Fig. 2. It is not desirable to provide the sections with a relatively deep marginal flange or to construct them in the same form as the cover section 13 so as not to objectionably increase the overall thickness of the links. It has been found, however, that shallow dishing of link sections 12 increase their rigidity and resistance to bending to a surprising degree so that they are not likely to buckle or rupture at the central apertures 14 or at other areas intermediate the ends under substantial twisting or other accidental strain on the bracelet. As a consequence, the links are far less likely than prior links to deform, break out at the rivet holes, or permit the rivet heads to pull out.

The dishing of the main link sections 12 so improves the strength thereof in the particulars mentioned that it has been found that such sections may be formed of extremely light gauge stainless steel or other durable metal instead of a substantially heavier gauge metal such as employed in the past.

Whereas expansible linkage as previously constructed is subject to frequent breakage the present linkage will provide a bracelet capable of long usage and which will withstand the roughest and toughest treatment without breaking.

As before indicated the embodiment of the invention illustrated comprises a watch bracelet, and in such form the opposite ends of the linkage are provided with watch-connecting clips 21 and 22 or equivalent elements. For ornamental bracelets the ends of the linkage may be detachably connected to each other or the linkage may take the form of an endless band.

I claim:

1. Expansible linkage for bracelets and the like comprising a series of articulated link elements arranged in pairs, the link elements of each pair being pivotally connected at their centers in crossed relation and the link elements of adjoining pairs being pivotally connected at their ends, said link elements each comprising a back section and a cover section secured to the back section, said back section being of shallow curved cross-sectional contour, and said back section being surrounded by an outwardly inclined margin which curves into the main body of the back section, said cover section having a plurality of integral flanges projecting from its edge and embracing the inclined margin of the back section to secure the cover section to the back section, apertures adjacent the ends and at the center of the back section, pivot elements having heads at opposite ends extending through said apertures and securing the link elements together, said apertures being substantially larger in diameter than the shanks of the pivot elements and the shanks between the opposite heads being sufficiently longer than the combined thickness of the material of the link back sections interconnected thereby, and not less than the combined depth of said interconnected back sections, as to constitute a lost motion connection, whereby the link elements may move axially of the pivot elements and tilt relative to one another when the linkage is subjected to appreciable twisting without causing the link back elements to bend or rupture, the contour of the back link sections reinforcing the same against bending in the area thereof adjacent the central pivot when the linkage is twisted beyond the operative limits of the lost motion connection between the back link sections and the central pivot elements.

2. Expansible linkage for bracelets and the like comprising a series of articulated link elements arranged in pairs, the link elements of each pair being pivotally connected at their centers in crossed relation and the link elements of adjoining pairs being pivotally connected at their ends, said link elements each comprising a back section and a cover section secured to the back section, apertures adjacent the ends and at the center of the back section, long pivot elements having heads at opposite ends extending through said apertures and securing the link elements together, said apertures being substantially larger in diameter than the shanks of the pivot elements and the shanks between opposite heads being of a length not less than a multiple of the combined thickness of the material of the link back sections interconnected thereby so as to constitute a lost motion connection, whereby the link elements tilt relatively to one another with the opposite ends of link elements moving in opposite directions along their respective pivot elements and simultaneously the centers of the link elements moving axially along the center pivot elements when the linkage is subjected to twisting, avoiding strain at the centers of the link elements.

JOSEPH J. VASTANO.

REFERENCES CITED

The following references are of record in the file of this patent:

UNITED STATES PATENTS

| Number | Name | Date |
| --- | --- | --- |
| 2,032,831 | Blackinton | Mar. 3, 1936 |
| 2,249,086 | MacIntosh | July 15, 1941 |
| 2,388,554 | Kreisler et al. | Nov. 6, 1945 |